United States Patent [19]
Meyer Swantée

[11] Patent Number: 4,855,533
[45] Date of Patent: Aug. 8, 1989

[54] BUSHING

[75] Inventor: Klaus B. Meyer Swantée, Mt. Eemnes, Netherlands

[73] Assignee: Pidou B.V., Netherlands

[21] Appl. No.: 195,193

[22] Filed: May 18, 1988

[30] Foreign Application Priority Data

May 29, 1987 [NL] Netherlands .......................... 8701274

[51] Int. Cl.⁴ ...................... H02G 3/22; H02G 15/068
[52] U.S. Cl. ................... 174/35 R; 174/65 R; 174/78; 248/56; 439/95; 439/98
[58] Field of Search ................... 174/35 R, 356, 65 R, 174/78, 6; 248/56; 439/95, 98, 607, 610

[56] References Cited

U.S. PATENT DOCUMENTS

| | | | |
|---|---|---|---|
| 4,362,898 | 12/1982 | Zendle et al. | 174/35 R |
| 4,464,540 | 8/1984 | Reeder | 439/610 |
| 4,547,623 | 10/1985 | Van Brunt et al. | 174/35 R |
| 4,653,836 | 3/1987 | Peele | 439/610 |
| 4,656,313 | 4/1987 | Moore et al. | 174/35 R |
| 4,677,253 | 6/1987 | Blomqvist | 174/35 R |

FOREIGN PATENT DOCUMENTS

| | | |
|---|---|---|
| 2414687 | 10/1975 | Fed. Rep. of Germany . |
| 2429049 | 1/1976 | Fed. Rep. of Germany ........ 248/56 |
| 2908163 | 9/1980 | Fed. Rep. of Germany .... 174/65 R |
| 173226 | 12/1976 | Netherlands . |
| 2156169A | 10/1985 | United Kingdom . |
| 2172756 | 9/1986 | United Kingdom . |

Primary Examiner—Morris H. Nimmo
Attorney, Agent, or Firm—Majestic, Parsons, Siebert & Hsue

[57] ABSTRACT

Bushing for the passage of at least one cable through a hole in a wall or similar structure, affording protection against electromagnetic overload and/or interference which bushing comprises two cable lead-through tubes which are each provided with a flange at its end which are detachably connected together with the aid of these flanges, while at least one earth plate is disposed between these flanges and electrically coupled therewith through a conductor in order to contact an electrically conducting braiding of the cable(s) passed through when the bushing is fully operational.

8 Claims, 4 Drawing Sheets

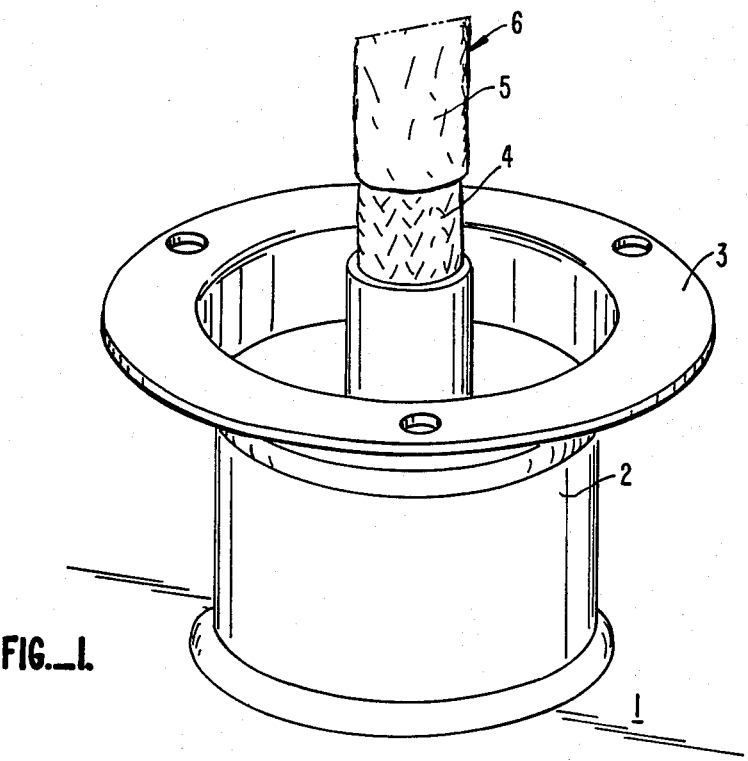
FIG._1.
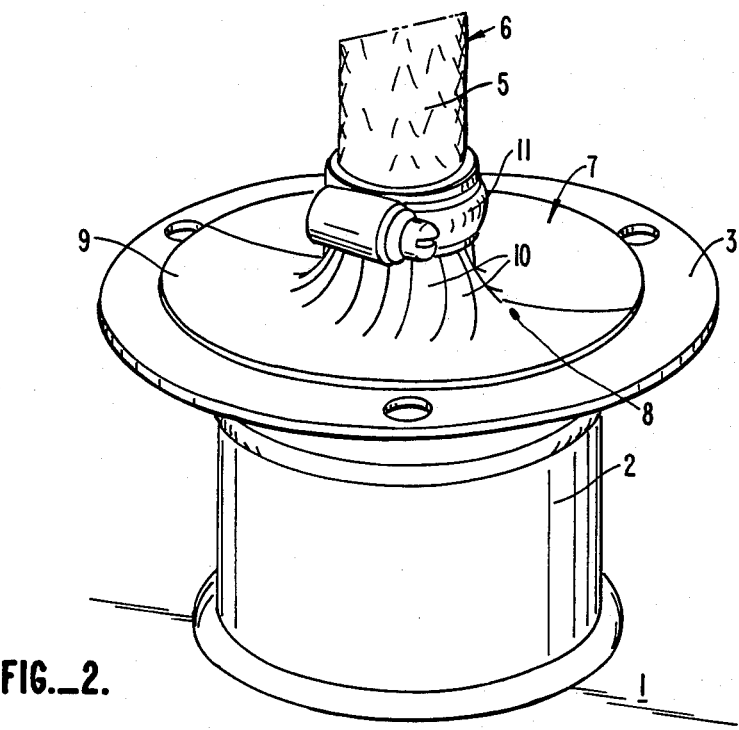
FIG._2.

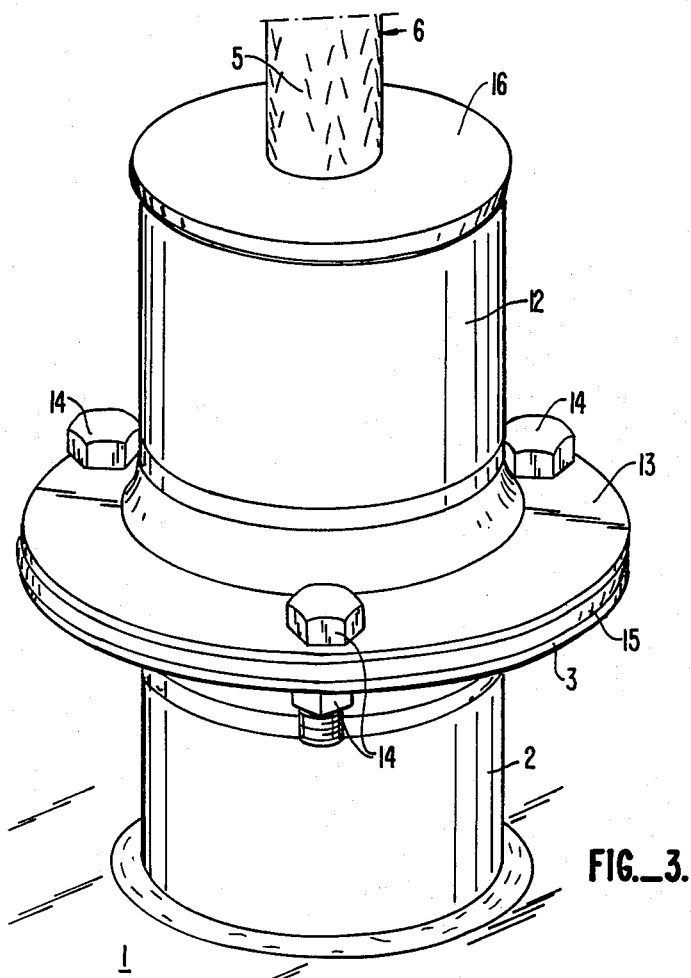
FIG._3.
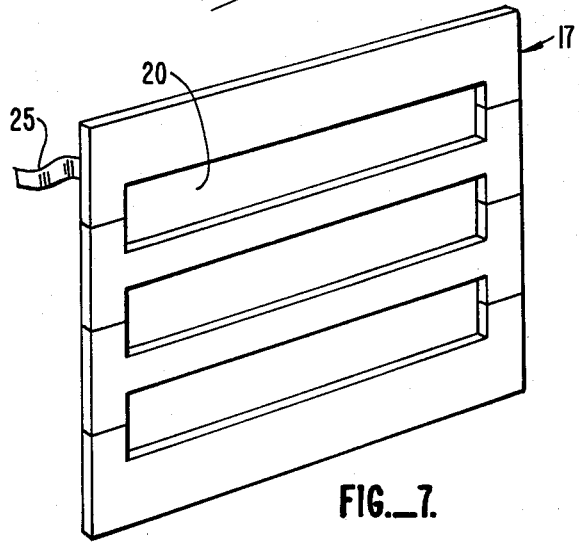
FIG._7.

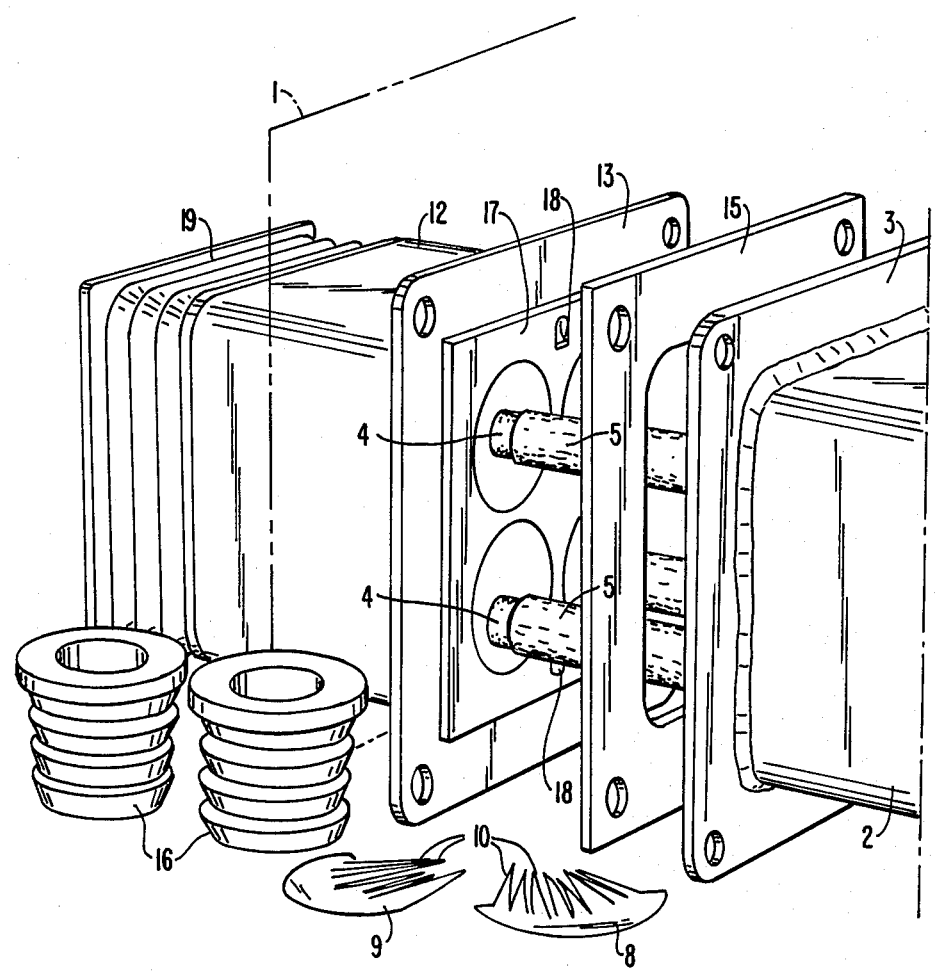
FIG._4.

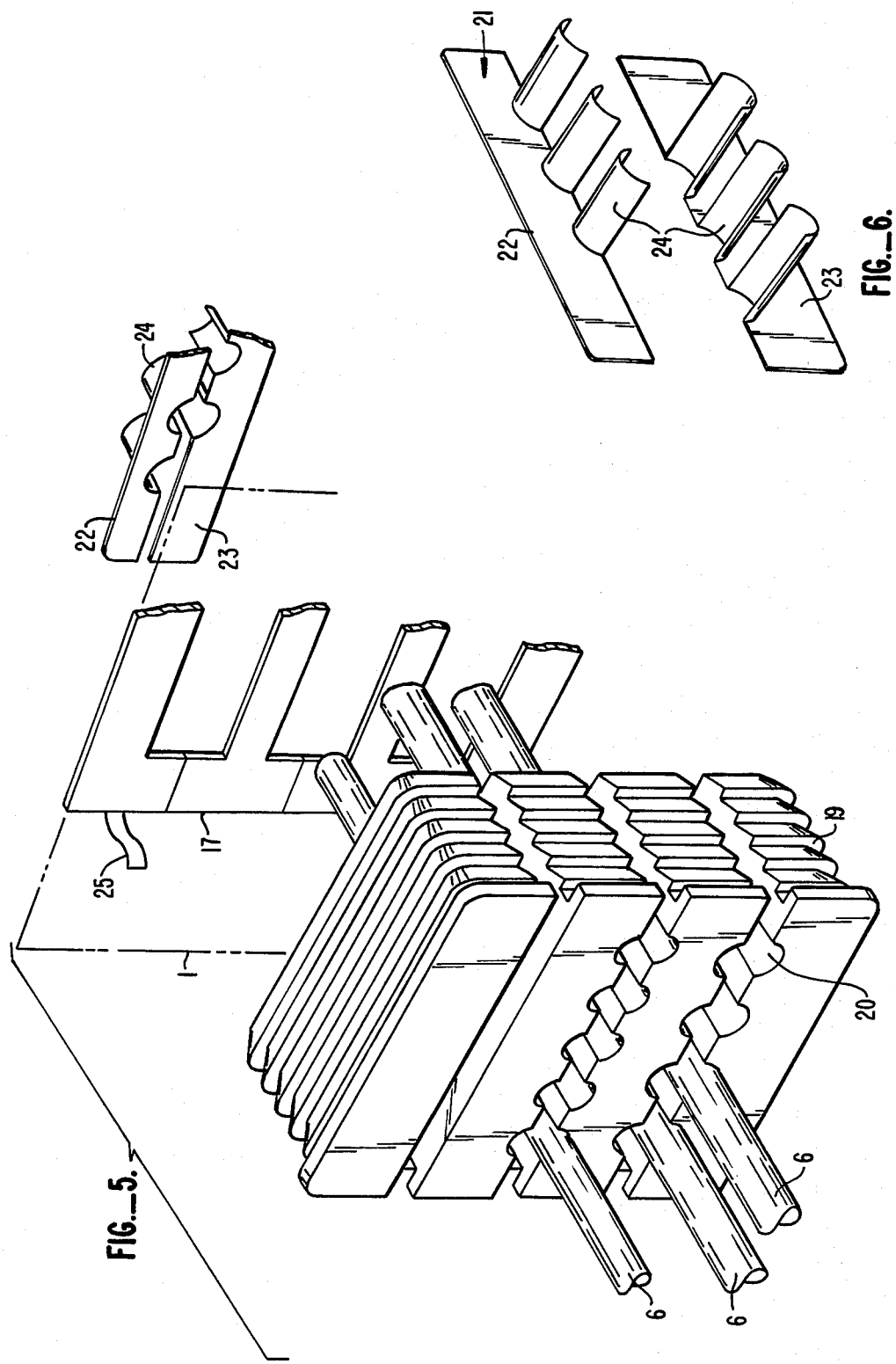

BUSHING

The invention relates to a bushing for the passage of at least one cable through a hole in a wall or other structure affording protection against electromagnetic overload and/or interference.

Such a bushing is known from the Netherlands patent specification NL 173.226. This known bushing comprises an electrically conducting wall lead-through bushing incorporating an overload-protection circuit which contains at least two shunt components for each supply and delivery cable core to be connected from the outside, and terminating in connectors for these cable cores. A partition connected to the wall lead-through bushing divides the aforesaid components into two sections, whereby all components of the protection circuit and the connectors of the supply and delivery cable cores have been mounted on an electrically insulating printed board. This printed board has been introduced as a prefabricated insert into the cavity of the wall duct attached to it in conjunction with the partition.

One disadvantage of the known bushing is that it is neither resistant to chemicals, nor fire-retardant, gastight and waterproof. A further drawback has been found to be that the known bushing is of a complex and expensive design. Moreover it offers hardly any opportunity, when mounted in position, to inspect its safety circuit in a simple manner.

An object of the present invention is to provide a bushing incorporating safeguards against electromagnetic overloading and/or interference, which is of simple design, inexpensive, chemically resistant, fire-retardant, gastight and water-tight, and whose safety circuit can readily be inspected, when mounted in position. According to the invention, an electrically conducting bushing of the type mentioned hereinbefore is characterized in that it comprises two cable lead-through tubes which are each provided with a flange at their ends which are detachably connected together with the aid of these flanges, while at least one earth plate is disposed between these flanges and electrically coupled therewith through a conductor in order to contact an electrically conducting braiding of the cable(s) passed through when the bushing is fully operational. Electrical installations and equipment in which highly sensitive components have frequently found application, for instance for control and registration purposes, are liable to disturbances by various external electromagnetic fields and pulses. Such external electromagnetic fields and pulses may have been generated by, for instance, radar installations, thunderstorms, nuclear explosions and electric appliances. In order to reduce these disturbances, it is common practice to place steel constructions acting as a Faraday screen round a space intended to accomodate electronic equipment. Nonetheless, electric cables passed into such a screened space may introduce undesirable electromagnetic fields and pulses into the electronic equipment, usually by way of the electrically conducting braiding of the relevant cables that have been passed through. Now according to the invention, the said undesirable external electromagnetic fields and pulses along the electrically conducting braiding of a lead-through cable will leak away to earth by way of the earth plate and flanges, thereby simply preventing the occurrence of said disturbances in electronic equipment. As the flanges have been detachably mounted, the present construction can also be readily inspected. Moreover, the present bushing has proved very suitable for the passage of a cable through a steel deck or partition on board a ship.

One embodiment of a bushing according to the invention is characterized in that the earth plate comprises at least two platelike parts provided with deflectable lugs, which lugs under operating conditions of the bushing rest at least partly against the electrically conducting braiding of the cable(s) passed through. This design permits the earth plate to be simply and firmly mounted round the electrically conducting braiding.

Another embodiment of the bushing according to the invention is characterized in that a ring gasket has been inserted between the flanges so as to be a close fit, with the ring gasket substantially encompassing the earth plate. This ring gasket aids in achieving a pressure-resistant, fireretardant, gastight and waterproof passage. More specifically, the ring gasket prevents the earth plate from corroding through contact with liquids, a point of special interest if the present bushing is to be used for the passage of cables through, for instance, ships' walls.

A further bushing embodiment of a bushing according to the invention, specifically for a multiple passage of cables, is characterized in that the ring gasket encompasses a passage plate fitted on the flanges and provided with cable lead-through holes, while for each cable at least one earth plate composed of two parts is available. The passage plate may, for instance, have concave lugs enabling the plate to be resiliently clamped inside a cable lead-through tube. The presence of a passage plate on both flanges makes it possible to grip the ring gasket tightly between the flanges with a fixed pre-compression.

The invention will now be elucidated further with reference to the accompanying drawings, in which:

FIGS. 1-3 represent a single bushing according to the invention;

FIG. 4 depicts a multiple bushing according to the invention;

FIG. 5 shows a cable lead-through plug according to the invention;

FIG. 6 represents an earth plate for a multiple bushing according to the invention; and FIG. 7 shows a passage plate for a multiple bushing according to the invention.

In FIG. 1 a wall 1 is visible through which a cable lead-through tube 2 having a flange 3 has been passed. A cable 6 provided with a metallic braiding 4 and an insulating sheathing 5 has been led through the wall 1 via the cable lead-through tube 2. The cable 6 has been stripped of its insulating sheathing 5 over part of its length, so that an earth plate 7 (FIG. 2) contacts the electrically conducting braiding 4 when the bushing is fully operational. The earth plate 7 here consists of two overlapping platelike parts 8, 9. These parts 8, 9 contain lugs 10 which have been clamped against the electrically conducting braiding 4 by means of a hose clamp 11.

FIG. 3 depicts the situation where a second cable lead-through tube 12 having a flange 13 has been attached to the cable lead-through tube 2 with the aid of bolts 14. A ring gasket 15 has been inserted between the flanges 3 and 13 so as to be a fine fit and the ring gasket 15 completely encompasses the platelike parts 8 and 9. Furthermore, the end of the cable lead-through tube 12 facing away from the flange end carries a cable lead-through plug 16. In similar fashion, the cable lead-through tube 2 will as a rule also be provided with such a cable lead-through plug.

FIG. 4 represents a multiple bushing. Here, a passage plate 17 has been resiliently mounted in each of the cable lead-through tubes 2, 12, the latter of which is passed through wall 1, by means of recessed lugs 18. In addition, a lead-through plug 19 may have been fitted inside at least one of the cable lead-through tubes 2, 12. Such a lead-through plug 19 may, for instance, have four lead-through holes 20 into which lead-through subplugs 16 may be pressed. In order not to complicate FIG. 4 unduly, the lead-through subplugs 16 and parts 8, 9 in the unbent state of the earth plate 7 have been represented besides the bushing.

FIG. 5 depicts a lead-through plug 19 as shown in FIG. 4 in which the use of lead-through subplugs 16 can be dispensed with. The lead-through plug 19 is divided into individual sections in particular by the center lines of the cable lead-through holes 20. This design has the advantage that a great many cables can be passed through, for instance, walls and floors in one very compact and readily installed lead-through plug. A further asset of this type of lead-through plug 19 is that it can be installed after the cables in question have been pulled through. It stands to reason that a passage plate 17 can also be divided horizontally into separate sections, especially through the center lines of its lead-through holes 20. A point of interest is that these lead-through holes 20 of the passage plate 17 may also be rectangular and that several cables may be passed through each individual lead-through hole 20. The earth plate, matching the lead-through plug 19, consists of two parts 22, 23 for every horizontal row of cable lead-through holes 20, each part being provided with a number of cylinder barrel segments 24 mounted perpendicular thereto, such that with the multiple bushing fully operational, each pair of segments, of which the two members belong to opposite parts 22, 23, can be fitted around a cable which has been passed through.

FIG. 6 shows an earth plate 21 matching the lead-through plug 19 of FIG. 5. The earth plate 21 consists of two parts 22, 23 for every horizontal row of cable lead-through holes 20, each part being provided with a number of cylinder barrel segments 24 mounted perpendicular thereto, such that with the bushing fully operational each pair of facing segments, of which the two members belong to opposite parts 22, 23, can be fitted round a cable which has been passed through.

FIG. 7 represents a passage plate 17 for use in a bushing with the lead-through plug 19 of FIG. 5 and the earth plate 21 of FIG. 6. The passage plate 17 is provided with clamping lugs 25.

I claim:

1. A bushing for the passage of at least one cable through a hole in a wall or similar structure, affording protection against electromagnetic overload and/or interference, characterized in that the bushing comprises two cable lead-through tubes which are each provided with a flange at its end which are detachably connected together with the aid of these flanges, while at least one earth plate is disposed between these flanges and electrically conductively coupled with said flanges in order to contact an electrically conducting braiding of the at least one cable to be passed through.

2. A bushing according to claim 1, characterized in that the earth plate comprises at least two platelike parts provided with deflectable lugs, which lugs under operating conditions of the bushing rest at least partly against the electrically conducting braiding of the at least one cable to be passed through.

3. A bushing according to claim 1, characterized in that the deflectable lugs have been clamped by means of a hose clamp against the electrically conducting braiding of the at least one cable to be passed through.

4. A bushing according to any one of claims 1–3, characterized in that a ring gasket has been inserted between the flanges so as to be a close fit, with the ring gasket substantially encompassing the earth plate.

5. A bushing according to claim 4, in particular for a multiple cable lead-through, characterized in that a passage plate is fitted on the flanges and the ring gasket encompasses said passage plate and is provided with cable lead-through holes, while for each cable to be passed through at least one earth plate composed of two parts is installed.

6. A bushing according to any one of claims 1, characterized in that the end of at least one of the cable lead-through tubes facing away from the flange end is provided with a cable lead-through plug.

7. A bushing according to claim 6 characterized in that the passage plate and/or the cable lead-through plug are horizontally divided into separate sections at least through center lines of cable lead-through holes, while the earth plate is composed of two parts for each horizontal row of cable lead-through holes, each part of which is provided with a number of cylinder barrel segments mounted perpendicular thereto, such that under operating conditions of the bushing each pair of facing segments, of which the two members belong to opposite parts, can be fitted around a cable which has been passed through.

8. A bushing according to any one of claims 2, 4 or 5, characterized in that the end of at least one of the cable lead-through tubes facing away from the flange end is provided with a cable lead-through plug.

* * * * *